US006950913B2

(12) United States Patent
Glasco

(10) Patent No.: US 6,950,913 B2
(45) Date of Patent: Sep. 27, 2005

(54) METHODS AND APPARATUS FOR MULTIPLE CLUSTER LOCKING

(75) Inventor: David B. Glasco, Austin, TX (US)

(73) Assignee: Newisys, Inc., Austin, TX (US)

( * ) Notice: Subject to any disclaimer, the term of this patent is extended or adjusted under 35 U.S.C. 154(b) by 230 days.

(21) Appl. No.: 10/291,895

(22) Filed: Nov. 8, 2002

(65) Prior Publication Data

US 2004/0093469 A1 May 13, 2004

(51) Int. Cl.[7] .............................................. G06F 12/06
(52) U.S. Cl. ..................... 711/152; 711/141; 703/225
(58) Field of Search ................................. 711/152, 141, 711/145; 709/225; 714/2, 5; 710/48, 269

(56) References Cited

U.S. PATENT DOCUMENTS

| | | | | |
|---|---|---|---|---|
| 4,399,504 A | * | 8/1983 | Obermarck et al. | 710/200 |
| 4,965,719 A | * | 10/1990 | Shoens et al. | 711/100 |
| 5,634,043 A | | 5/1997 | Self et al. | 395/558 |
| 5,946,710 A | | 8/1999 | Bauman et al. | 711/129 |
| 6,122,659 A | * | 9/2000 | Olnowich | 709/213 |
| 6,151,688 A | * | 11/2000 | Wipfel et al. | 714/48 |
| 6,167,492 A | | 12/2000 | Keller et al. | 711/154 |
| 6,385,705 B1 | | 5/2002 | Keller et al. | 711/154 |
| 6,473,849 B1 | * | 10/2002 | Keller et al. | 712/30 |
| 6,490,661 B1 | | 12/2002 | Keller et al. | 711/150 |
| 6,587,921 B2 | * | 7/2003 | Chiu et al. | 711/119 |
| 6,631,447 B1 | * | 10/2003 | Morioka et al. | 711/141 |
| 6,651,136 B2 | * | 11/2003 | Percival | 711/113 |
| 2002/0083299 A1 | | 6/2002 | Van Huben et al. | 712/29 |

FOREIGN PATENT DOCUMENTS

EP 0447160 9/1991 .......... G06F/12/08

OTHER PUBLICATIONS

Nowatzk, A., et al., Parallel Computing: Trends and Applications, Exploiting Parallelism in Cache Coherency Protocol Engines, Grenoble France, pp. 269–286, Sep. 1993.*
Abdelrahman, et al., University of Toronto, Distributed Array Data Management on NUMA Multiprocessors, pp. 551–559, 1994.*
Al–Mouhamed, Transaction of Parallel and Dsitributed Systems, Analysis of Macro–Dataflow Dynamic Scheduling on Nonuniform Memory Access Architectures, vol. 4, No. 8, pp. 875–888, Aug. 1993.*
HyperTransport™ I/O Link Specification Revision 1.03, HyperTransport™ Consortium, Oct. 10, 2001 Copyright © 2001 HyperTransport Technology Consortium.

* cited by examiner

Primary Examiner—Pierre-Michel Bataille
(74) Attorney, Agent, or Firm—Beyer Weaver & Thomas LLP

(57) ABSTRACT

Methods and devices are provided for controlling lock and unlock operations within a computer system. A home cluster includes a home lock manager. The home lock manager is a master lock manager for the home cluster and for a plurality of remote clusters, the plurality of remote clusters including remote cache coherency controllers and a plurality of remote processors. Lock and unlock commands from the home lock manager are transmitted by a home cache coherency controller to the remote cache coherency controllers and forwarded to the remote processors.

20 Claims, 14 Drawing Sheets

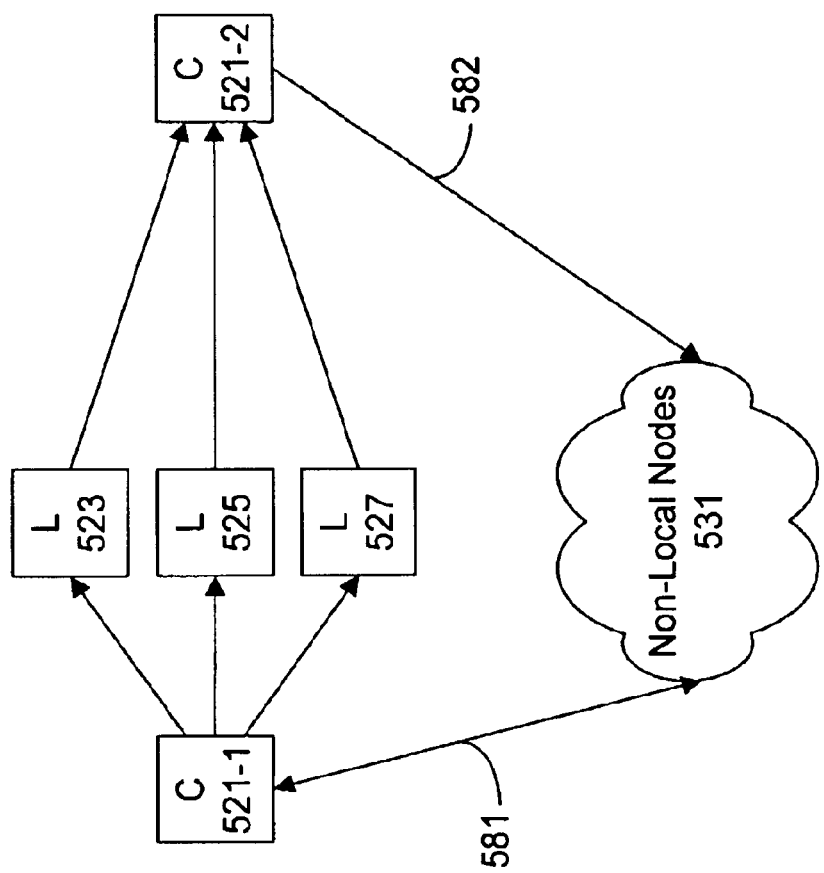

METHODS AND APPARATUS FOR MULTIPLE CLUSTER LOCKING

BACKGROUND OF THE INVENTION

1. Field of the Invention

The present invention generally relates to accessing data in a multiple processor system. More specifically, the present invention provides techniques for improving lock mechanisms for maintaining cache coherency in a multiple processor system having a multiple-cluster architecture.

2. Description of Related Art

Performance limitations in a conventional computer system using a bus architecture have led to the development of a point-to-point architecture for connecting processors in a system with a single memory space. In one example, individual processors can be directly connected to each other through a plurality of point-to-point links to form a cluster of processors. Separate clusters of processors can also be connected. The point-to-point links significantly increase the bandwidth for coprocessing and multiprocessing functions.

However, using a point-to-point architecture to connect multiple processors in a multiple-cluster system sharing a single memory space presents various problems. Some of these problems arise in the context of coordinating processes in which multiple nodes are working on a common task and/or are seeking to access common data words. However, locking mechanisms for point-to-point architectures are limited. Consequently, it is desirable to provide techniques for improving lock mechanisms for cache coherency in systems having multiple clusters of multiple processors connected using point-to-point links.

SUMMARY OF THE INVENTION

According to the present invention, methods and devices are provided for increasing the efficiency of locking mechanisms in a multiple processor, multiple-cluster system. According to some embodiments of the present invention, a home cluster includes plurality of home nodes. The home nodes may include, for example, a home cache coherence controller, one or more home processors, a home memory controller, a home I/O bridge and a home lock manager. A remote cache coherence controller of each remote cluster of processors acts as a local lock manager for the remote cluster, under the control of a home lock manager. However, the home lock manager may or may not be aware of nodes outside of the home cluster. Commands and responses are transmitted between clusters via the cache coherence controllers.

According to various embodiments, a computer system is provided. The computer system includes: a home cluster comprising a plurality of home nodes, the home nodes including a plurality of home processors and a home cache coherence controller. One of the home nodes includes a home lock manager configured to broadcast a lock command to all home nodes in response to a lock request. The home nodes are interconnected in a first point-to-point architecture. The computer system also has a first remote cluster including a first remote cache coherence controller and a first plurality of remote processors. The first remote cache coherence controller and the first plurality of remote processors are interconnected in a second point-to-point architecture. The first remote cache coherence controller is configured to receive the lock command via the home cache coherence controller and to forward the lock command to the first plurality of remote processors.

According to other embodiments, another computer system is provided which includes a home cluster. The home cluster includes a plurality of home nodes interconnected in a first point-to-point architecture, including a plurality of home processors and a home cache coherence controller. One of the home nodes includes a home lock manager. Each home node includes a home configuration register that specifies a location of the home lock manager as a recipient of home lock requests. The computer system also has a first remote cluster, including a first remote cache coherence controller and a first plurality of remote processors, wherein the first remote cache coherence controller and the first plurality of remote processors are interconnected in a second point-to-point architecture, wherein the first remote cache coherence controller is interconnected with the home cache coherence controller and wherein each of the first plurality of remote processors includes a first remote configuration register that specifies a location of the first remote cache coherence controller as a recipient of first remote lock requests.

According to still other embodiments a computer system is provided, including: a home cluster which has a plurality of home nodes, including a plurality of home processors and a home cache coherence controller interconnected in a first point-to-point architecture. One of the home nodes includes a home lock manager. The computer system also has a first remote cluster, including a first remote cache coherence controller and a first plurality of remote processors. The first remote cache coherence controller and the first plurality of remote processors are interconnected in a second point-to-point architecture. The first remote cache coherence controller is interconnected with the home cache coherence controller. The first remote cache coherence controller is configured to act as a first remote lock manager for the first remote cluster.

According to some aspects of the invention, a method of controlling lock commands within a computer system is provided. The method includes: receiving a lock request from a requesting home node of a plurality of home nodes in a home cluster, the home nodes including a plurality of home processors and a home cache coherence controller interconnected in a first point-to-point architecture; broadcasting a lock command to all home nodes, the lock command responsive to the lock request; and transmitting the lock command from the home cache coherence controller to a first remote cache coherence controller of a first remote cluster including a plurality of first remote processors interconnected in a second point-to-point architecture with the first remote cache coherence controller.

According to other aspects of the invention, a method of controlling lock commands within a computer system is provided. The method includes: receiving a lock request from a requesting home node of a plurality of home nodes in a home cluster, the plurality of home nodes including a plurality of home processors and a home cache coherence controller interconnected in a first point-to-point architecture; broadcasting a lock command to all home nodes, the lock command responsive to the lock request; transmitting the lock command from the home cache coherence controller to a first remote cache coherence controller of a first remote cluster including a plurality of first remote processors interconnected in a second point-to-point architecture with the first remote cache coherence controller; forwarding the lock command to each first remote processor of the plurality of first remote processors; transmitting a first locked response from each first remote processor to the first remote cache coherence controller, the first locked response indicating that one of the remote processors of the plurality of first remote processors has complied with the lock command; transmitting a first remote cluster locked response from the first remote cache coherence controller to the home cache coherence controller, the first remote cluster locked response indicating that each first remote processor of the plurality of first remote processors has complied with the lock command; transmitting a home locked response from each home processor to the home lock manager, the home locked response indicating compliance with the lock command; relaying the first remote cluster locked response from the home cache coherence controller to the home lock manager; and sending a system locked response to the requesting home node after the home lock manager receives the home locked response and the first remote cluster locked response.

Some such aspects of the invention also include: receiving an unlock request from the requesting home node; broadcasting an unlock command to all home nodes, the unlock command responsive to the unlock request; transmitting the unlock command to the first remote cache coherence controller; forwarding the unlock command to each first remote processor of the plurality of first remote processors; transmitting a first unlocked response from each first remote processor to the first remote cache coherence controller, the first unlocked response indicating that one of the first remote processors has complied with the unlock command; transmitting a first remote cluster unlocked response from the first remote cache coherence controller to the home cache coherence controller, the first remote cluster unlocked response indicating that each first remote processor of the plurality of first remote processors has complied with the unlock command; transmitting a home unlocked response from each home processor to the home lock manager, the home unlocked response indicating compliance with the unlock command; relaying the first remote cluster unlocked response from the home cache coherence controller to the home lock manager; and sending a system unlocked response to the requesting node after the home lock manager receives the home unlocked response and the first remote cluster unlocked response.

Some embodiments of the invention provide a computer program embodied in a computer-readable storage medium. The computer program includes instructions which cause a computer to: send a lock request to a home lock manager from a requesting home node of a plurality of home nodes in a home cluster, the plurality of home nodes including a plurality of home processors and a home cache coherence controller interconnected in a first point-to-point architecture; broadcast a lock command from the home lock manager to all home nodes, the lock command responsive to the lock request; transmit the lock command from the home cache coherence controller to a first remote cache coherence controller of a first remote cluster including a plurality of first remote processors interconnected in a second point-to-point architecture with the first remote cache coherence controller; forward the lock command to each first remote processor of the plurality of first remote processors; transmit a first locked response from each first remote processor to the first remote cache coherence controller, the first locked response indicating that one of the remote processor of the plurality of first remote processors has complied with the lock command; transmit a first remote cluster locked response from the first remote cache coherence controller to the home cache coherence controller, the first remote cluster locked response indicating that each first remote processor of the plurality of first remote processors has complied with the lock command; transmit a home locked response from each home processor to the home lock manager, the home locked response indicating compliance with the lock command; relay the first remote cluster locked response from the home cache coherence controller to the home lock manager; and send a system locked response from the home lock manager to the requesting home node after the home lock manager receives the home locked response and the first remote cluster locked response.

Some such computer programs include instructions that cause a computer to: receive an unlock request from the requesting home node; broadcast an unlock command to all home nodes, the unlock command responsive to the unlock request; transmit the unlock command to the first remote cache coherence controller; forward the unlock command to each first remote processor of the plurality of first remote processors; transmit a first unlocked response from each first remote processor to the first remote cache coherence controller, the first unlocked response indicating that one remote processor of the first plurality of remote processors has complied with the unlock command; transmit a first remote cluster unlocked response from the first remote cache coherence controller to the home cache coherence controller, the first remote cluster unlocked response indicating that each remote processor of the plurality of first remote processors has complied with the unlock command; transmit a home unlocked response from each home processor to the home lock manager, the home unlocked response indicating compliance with the unlock command; relay the first remote cluster unlocked response from the home cache coherence controller to the home lock manager; and send a system unlocked response to the requesting home node after the home lock manager receives the home unlocked response and the first remote cluster unlocked response.

Yet other embodiments of the invention provide a computer system, including: a home cluster having a plurality of home processors and a home cache coherence controller interconnected in a first point-to-point architecture, wherein one of the home processors includes a home lock manager; a first remote cluster including a first plurality of remote processors and a first remote cache coherence controller interconnected in a second point-to-point architecture, wherein the first remote cache coherence controller is interconnected with the home cache coherence controller and wherein the first remote cache coherence controller is configured to act as a first remote cluster lock manager by relaying signals to and from the home lock manager via the home cache coherence controller; and a second remote cluster including a second plurality of remote processors and a second remote cache coherence controller interconnected in a third point-to-point architecture, wherein the second remote cache coherence controller is interconnected with the home cache coherence controller and wherein the second remote cache coherence controller is configured to act as a second remote cluster lock manager by relaying signals to and from the home lock manager via the home cache coherence controller.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIGS. 5A through 5D are diagrammatic representations showing cache coherence controller functionality.

DETAILED DESCRIPTION OF SPECIFIC EMBODIMENTS

Figure 1A:
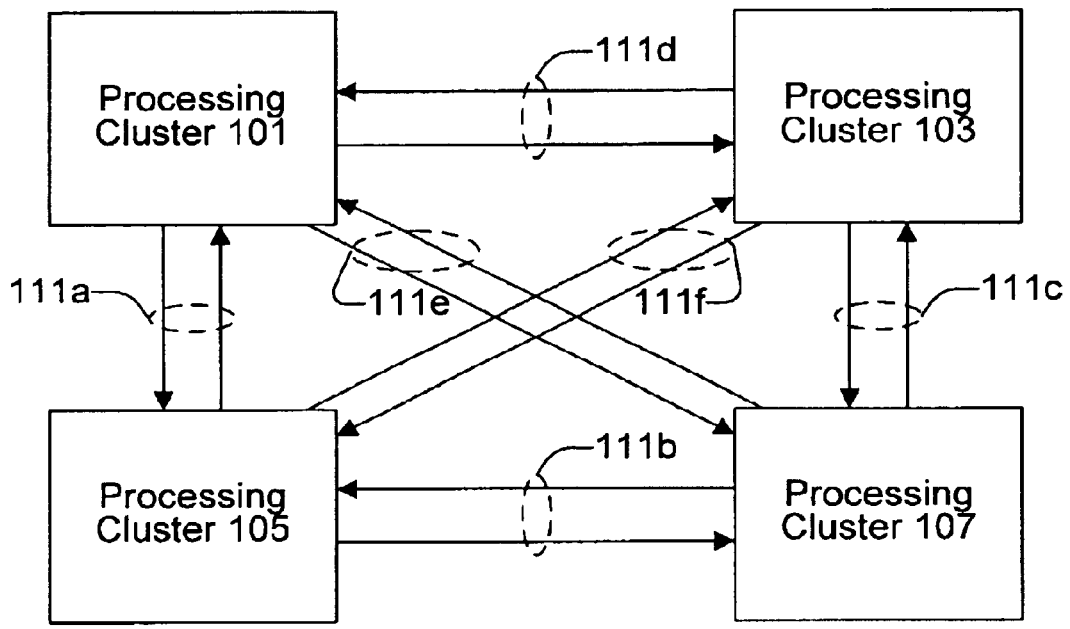
FIG. 1A and 1B are diagrammatic representations depicting a system having multiple clusters.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multiprocessor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Techniques are provided for increasing data access efficiency in a multiple processor, multiple-cluster system. In a point-to-point architecture, a cluster of processors includes multiple processors directly connected to each other through point-to-point links. By using point-to-point links instead of a conventional shared bus or external network, multiple processors are used efficiently in a system sharing the same memory space. Processing and network efficiency are also improved by avoiding many of the bandwidth and latency limitations of conventional bus and external network based multiprocessor architectures. According to various embodiments, however, linearly increasing the number of processors in a point-to-point architecture leads to an exponential increase in the number of links used to connect the multiple processors. In order to reduce the number of links used and to further modularize a multiprocessor system using a point-to-point architecture, multiple clusters are used.

According to various embodiments, the multiple processor clusters are interconnected using a point-to-point architecture. Each cluster of processors includes a cache coherence controller, which is used to handle communications between clusters. Each cluster of processors may include any convenient number of processors. In one embodiment, the point-to-point architecture used to connect processors is used to connect clusters as well.

By using a cache coherence controller, multiple-cluster systems can be built using processors that may not necessarily support multiple clusters. Such a multiple-cluster system can be built by using a cache coherence controller to represent non-local nodes in local transactions so that local nodes do not need to be aware of the existence of nodes outside of the local cluster. More detail on the cache coherence controller will be provided below.

Any mechanism for ordering data access requests is referred to herein as a serialization point. In a single cluster system, cache coherency can be maintained by sending all data access requests through one or more such serialization points. One example of a serialization point is a memory controller, which may act as a lock manager. Various processors in the single cluster system can send data access requests to a memory controller. In some embodiments, each processor in the cluster includes a memory controller. In one example, the memory controller is configured to serialize the data access requests so that only one data access request for a given memory line is allowed at any particular time. If another processor attempts to access the same memory line, the data access attempt is blocked. The memory controller allows cache coherency to be maintained in a multiple processor, single cluster system.

Serialization points can also be used in a multiple processor, multiple-cluster system where the processors in the various clusters share a single address space. By using a single address space, internal point-to-point links can be used to significantly improve intercluster communication over traditional external network based multiple-cluster systems. In some embodiments, each processor includes a memory controller. Various processors in various clusters send data access requests to a memory controller associated with a particular cluster. In some embodiments, a cache coherence controller in each cluster includes a cache directory that indicates which memory lines are cached in other clusters. A memory controller, which may be part of the cache coherence controller, can serialize all data requests from the different clusters.

However, a serialization point in a multiple processor, multiple-cluster system may not be as efficient as a serialization point in a multiple processor, single cluster system. That is, delay resulting from factors such as latency from transmitting between clusters can adversely affect the response times for various data access requests. It should be noted that delay also results from the use of probes in a multiple processor environment.

Figure 1B:
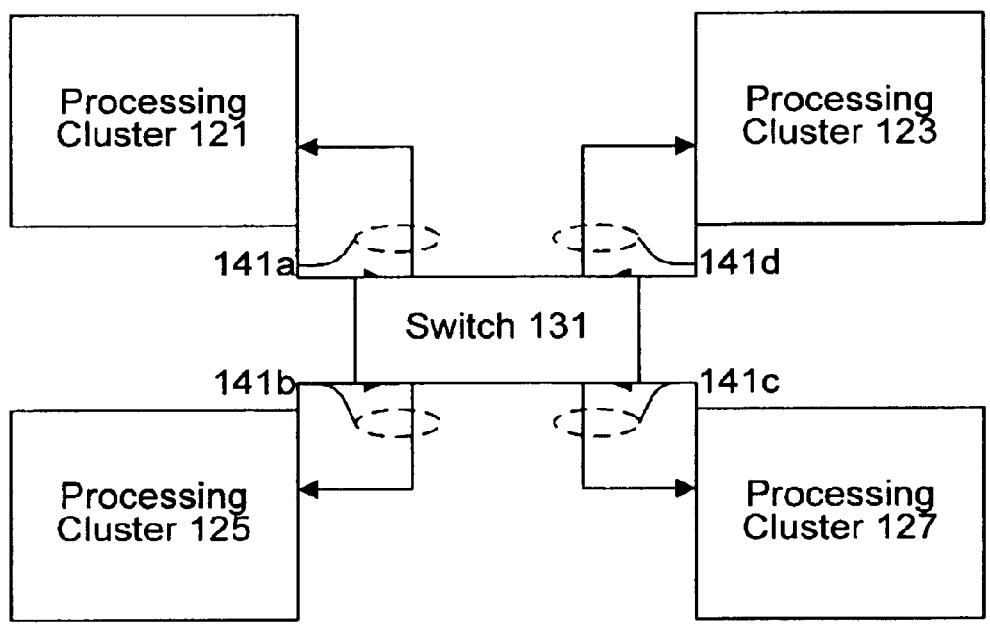

FIG. 1A is a diagrammatic representation of one example of a multiple cluster, multiple processor system that can use the techniques of the present invention. Although four processing clusters (also referred to herein as "clusters") are illustrated in FIGS. 1A and 1B, a multiple-cluster system may include any convenient number of clusters. Moreover, each of clusters 101, 103, 105, and 107 can include a plurality of processors, memory controllers, I/O bridges and lock managers. Clusters 101, 103, 105, and 107 are connected to each other through point-to-point links 111a–f. In one embodiment, the multiple processors in the multiple-cluster architecture shown in FIG. 1A share the same memory space. In this example, point-to-point links 111a–f are internal system connections that are used in place of a traditional front-side bus to connect the multiple processors in clusters 101, 103, 105, and 107. The point-to-point links 111a–f may support any point-to-point coherence protocol.

FIG. 1B is a diagrammatic representation of another example of a multiple cluster, multiple processor system that can use the techniques of the present invention. Each of clusters 121, 123, 125, and 127 can be coupled to switch 131 through point-to-point links 141a–d. It should be noted that using switch 131 and point-to-point links 141a–d allows implementation with fewer point-to-point links when connecting multiple clusters in the system. Switch 131 can include a processor with a coherence protocol interface. According to various implementations, a multicluster system shown in FIG. 1A is expanded using switch 131 as shown in FIG. 1B.

Figure 2:
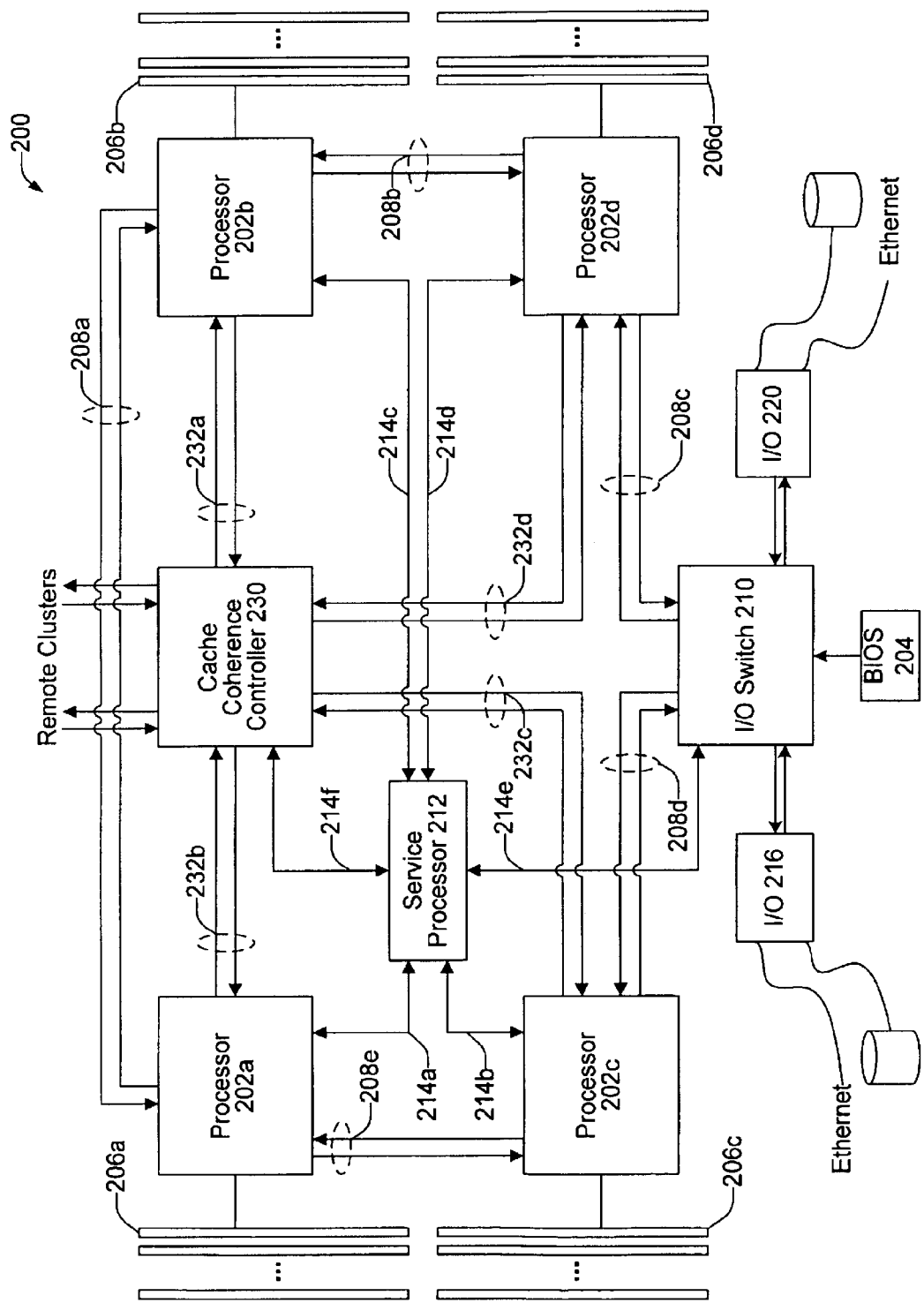
FIG. 2 is a diagrammatic representation of a cluster having a plurality of processors.

FIG. 2 is a diagrammatic representation of one example of a multiple processor cluster, such as cluster 101 shown in FIG. 1A. Cluster 200 includes processors 202a–202d, one or more Basic I/O systems (BIOS) 204, a memory subsystem comprising memory banks 206a–206d, point-to-point communication links 208a–208e, and service processor 212. Point-to-point communication links 208a–208e are configured to allow interconnections between processors 202a–202d, I/O switch 210 and cache coherence controller 230. Service processor 212 is configured to allow communications with processors 202a–202d, I/O switch 210, and cache coherence controller 230 via a JTAG interface, which is represented in FIG. 2 by links 214a–214f. It should be noted that other interfaces are supported. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein. An exemplary service processor and computer system partitioning are described in patent application Ser. No. 09/932,456 titled Computer System Partitioning Using Data Transfer Routing Mechanism, filed on Aug. 16, 2001, the entirety of which is incorporated by reference for all purposes.

Processors 202a–d are also coupled to cache coherence controller 230 through point-to-point links 232a–d. Any mechanism or apparatus that can be used to provide communication between multiple processor clusters while maintaining cache coherence is referred to herein as a cache coherence controller. Cache coherence controller 230 can be coupled to cache coherence controllers associated with other multiprocessor clusters. It should be noted that there can be more than one cache coherence controller in one cluster. Cache coherence controller 230 preferably communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a–206d may comprise double data rate (DDR) memory which is physically provided as dual in-line memory modules (DIMMs). I/O adapter 216 may be, for example, an ultra direct memory access (UDMA) controller or a small computer system interface (SCSI) controller that provides access to a permanent storage device. I/O adapter 220 may be an Ethernet card adapted to provide communications with a network such as, for example, a local area network (LAN) or the Internet.

According to a specific embodiment and as shown in FIG. 2, both of I/O adapters 216 and 220 provide symmetric I/O access. That is, each provides access to equivalent sets of I/O. As will be understood, such a configuration would facilitate a partitioning scheme in which multiple partitions have access to the same types of I/O. However, it should also be understood that embodiments are envisioned in which partitions without I/O are created. For example, a partition including one or more processors and associated memory resources, i.e., a memory complex, could be created for the purpose of testing the memory complex.

According to one embodiment, service processor 212 is a Motorola MPC855T microprocessor that includes integrated chipset functions. Cache coherence controller 230 is an Application Specific Integrated Circuit (ASIC) supporting the local point-to-point coherence protocol. Cache coherence controller 230 can also be configured to handle a non-coherent protocol to allow communication with I/O devices. Cache coherence controller 230 may be a specially configured programmable chip such as a programmable logic device or a field programmable gate array.

It should also be noted that in some implementations, a service processor is not included in multiple processor clusters. Moreover, other cluster architectures are within the scope of the present invention. For example, other architectures may include more or fewer processors 202. It should further be noted that the terms "node" and "processor" are often used interchangeably herein. However, it should be understood that according to various implementations, a node (e.g., processors 202a–202d) may comprise multiple sub-units.

Figure 2A:
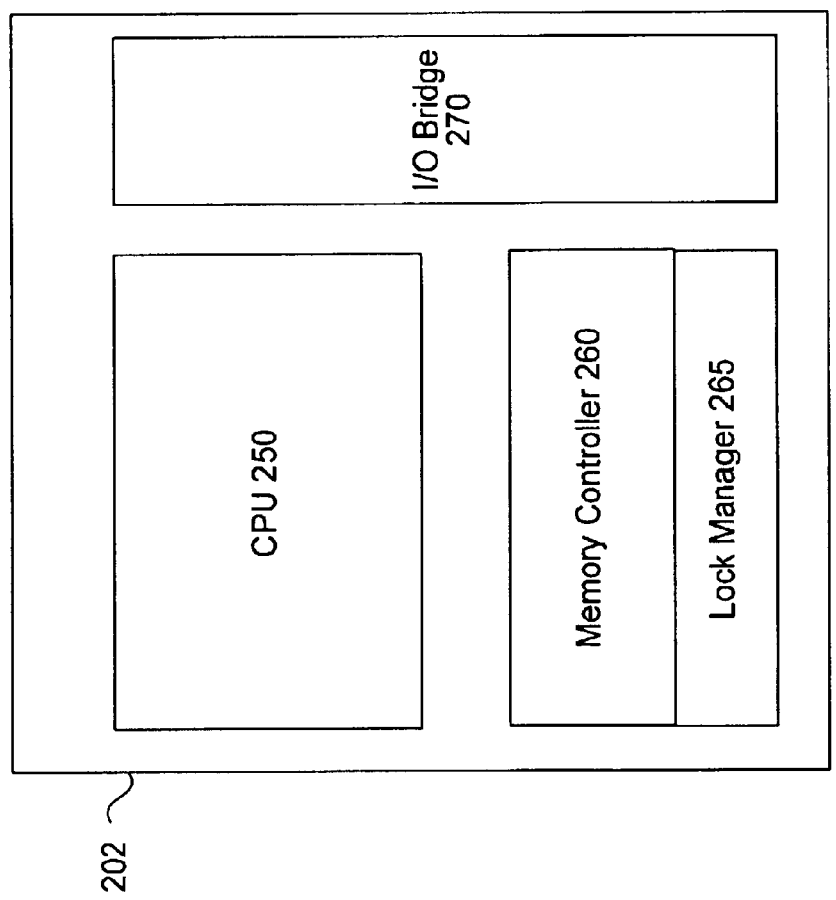
FIG. 2A is a diagrammatic representation of a node that includes multiple sub-units.

FIG. 2A illustrates one such node which contains multiple sub-units. Node 202 includes CPU 250, memory controller 260 and I/O bridge 270. In this embodiment, memory controller 260 includes lock manager 265. Lock manager 265 is one embodiment of home lock manager 720, which will be described in detail below with reference to FIGS. 7 through 10. Lock manager 265 may be part of a processor's memory controller, as shown in FIG. 2A, or lock manager 265 may be another component of a node. Alternatively, lock manager 265 may be part of another node or may be a separate node, such as a separate controller.

Figure 3:
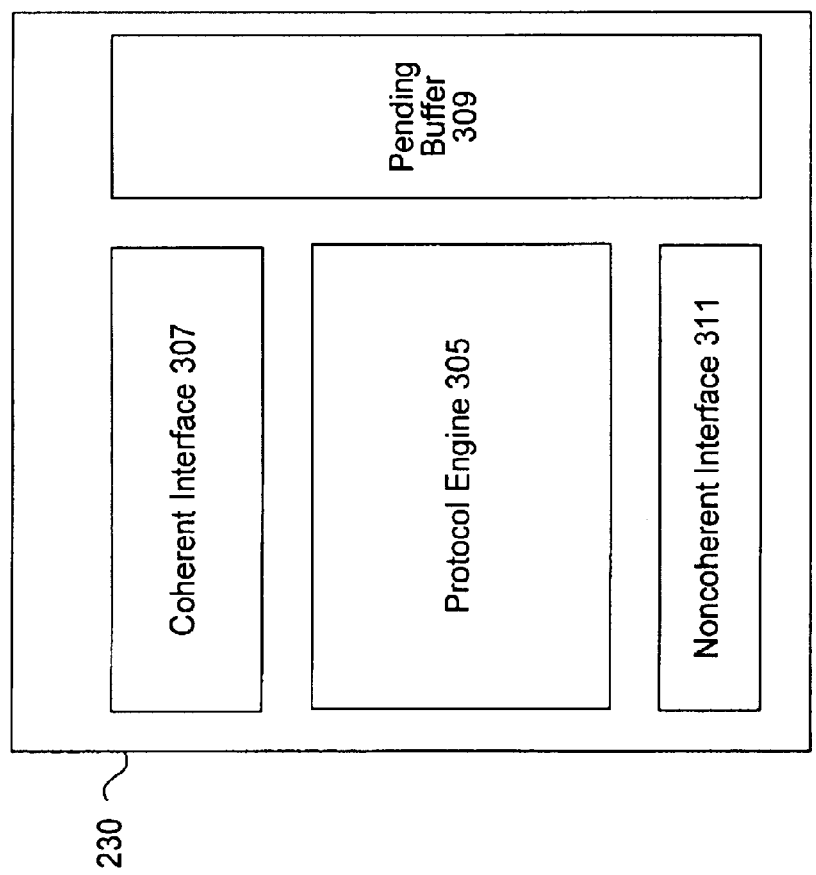
FIG. 3 is a diagrammatic representation of a cache coherence controller.

FIG. 3 is a diagrammatic representation of one example of cache coherence controller 230. According to various embodiments, the cache coherence controller includes protocol engine 305, which is configured to handle packets such as probes and requests received from processors in various clusters of a multiprocessor system. The functionality of protocol engine 305 can be partitioned across several engines to improve performance. In one example, partitioning is done based on packet type (request, probe, response, etc.), direction (incoming and outgoing), or transaction flow (request flows, probe flows, etc).

Protocol engine 305 has access to pending buffer 309 that allows cache coherence controller 230 to track transactions such as recent requests and probes and to associate the transactions with specific processors. Transaction information maintained in pending buffer 309 can include transaction destination nodes, the addresses of requests for subsequent collision detection and protocol optimizations, response information, tags, state information and other information.

The cache coherence controller has an interface such as coherent protocol interface 307 that allows the cache coherence controller to communicate with other processors in the cluster as well as external processor clusters. According to various embodiments, each of interfaces 307 and 311 is implemented either as a full crossbar or as a separate receive and transmit unit, using components such as multiplexers and buffers. The cache coherence controller can also include other interfaces such as non-coherent protocol interface 311 for communicating with I/O devices. It should be noted, however, that cache coherence controller 230 does not necessarily need to provide both coherent and non-coherent interfaces. It should also be noted that a cache coherence controller in one cluster can communicate with a cache coherence controller in another cluster.

Figure 4:
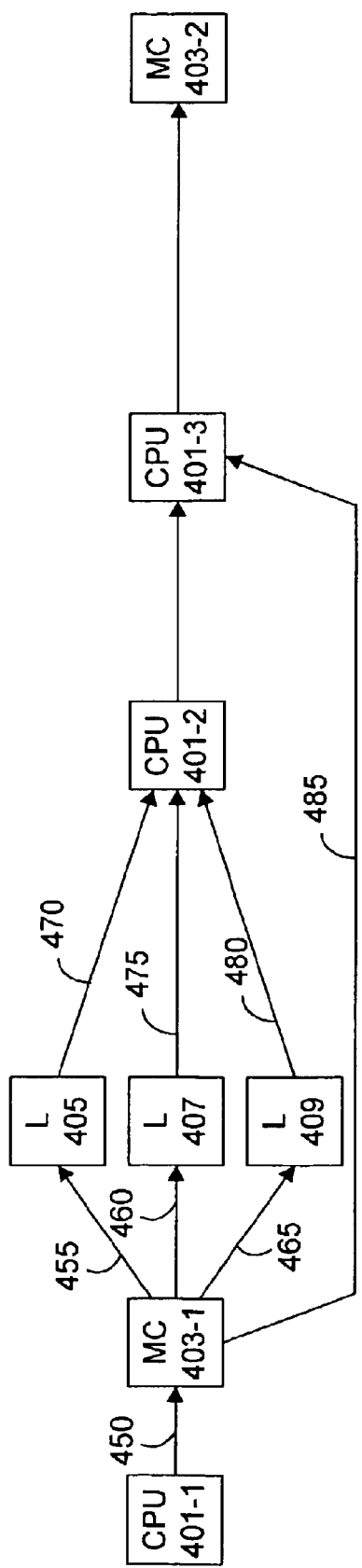
FIG. 4 is a diagrammatic representation showing a transaction flow for a data access request from a processor in a single cluster.

FIG. 4 is a diagrammatic representation showing the transactions for a cache request from a processor in a system having a single cluster without using a cache coherence controller. As used herein, element "XXX-s" refers to element XXX at step "s." For example, processor 401-1 means processor 401 at step 1. Here, processor 401-1 sends access request 450 (such as a read memory line request) to memory controller 403-1. Memory controller 403-1 may be associated with this processor or with another node in the cluster. Alternatively, memory controller 403-1 may be a separate component such as an ASIC or specially configured Programmable Logic Device (PLD).

To preserve cache coherence, only one processor is typically allowed to access a memory line corresponding to a shared address space at anyone given time. To prevent other processors from attempting to access the same memory line, memory controller 403-1 can lock the memory line. After the memory line is locked, all other requests to the same memory line are blocked or queued. Access by another processor is typically allowed only when memory controller 403-1 unlocks the memory line.

Memory controller 403-1 then sends probes 455, 460 and 465 to the local cache memories 405, 407, and 409 to determine cache states. Local cache memories 405, 407, and 409 then send probe responses 470, 475 and 480 to processor 401-2. The memory controller 403-1 also sends access response 485 (such as a read response) to processor 401-3. Processor 401-3 can then send a "done" response to memory controller 403-2 to allow memory controller 403-2 to unlock the memory line for subsequent requests. It should be noted that CPU 401-1, CPU 401-2, and CPU 401-3 refer to processor 401 at steps 1, 2 and 3.

FIGS. 5A–5D are diagrammatic representations depicting cache coherence controller operation. The use of a cache coherence controller in multiprocessor clusters allows the creation of a multiprocessor, multicluster coherent domain without affecting the functionality of local nodes such as processors and associated memory controllers in each cluster. In some instances, processors may only support a protocol that allows for a limited number of processors in a single cluster without allowing for multiple clusters. The cache coherence controller can be used to allow multiple-cluster systems by making local processors believe that the non-local nodes are merely a single local node embodied in the cache coherence controller. In some such embodiments, the processors in a cluster do not need to be aware of processors in other clusters. Instead, the processors in the cluster communicate with the cache coherence controller as though the cache coherence controller were representing all non-local nodes.

It should be noted that nodes in a remote cluster will be referred to herein as "non-local nodes" or as "remote nodes." However, the phrase "non-local nodes" refers to nodes not in a request cluster generally and includes nodes in both a remote cluster and nodes in a home cluster. A cluster from which a data access or cache access request originates may be referred to herein as a request cluster. A cluster containing a serialization point that processes a request, such as memory controller 403, is referred to herein as a home cluster. In the context of lock management according to the present invention, the home cluster is the cluster that contains home lock manager 720, which will be described below with reference to FIGS. 7 through 10. Other clusters are referred to as remote clusters. The home cluster and the remote cluster are also referred to herein as non-local clusters. According to various embodiments, the memory address resides at a local memory controller.

It should also be noted that a coherence protocol can contain several types of messages. In one example, a coherence protocol includes various types of messages, including the following: data or cache access requests, probes, commands, such as "lock" or "unlock" commands; responses, including probe responses, "locked" and "unlocked" responses; and data packets.

"Lock" and "unlock" commands are issued by a lock manager, which may be a separate node or part of another node. In some embodiments, a lock manager is part of a memory controller associated with a processor. Lock commands instruct a node not to access any additional data from a shared memory until after receiving a subsequent unlock command. In preferred embodiments, nodes are instructed to stop generating any system transactions until after receiving a subsequent unlock command. According to various embodiments, lock commands of the present invention provide a mechanism for locking multiple nodes in multiple clusters to allow transactions to appear to execute atomically. That is, the lock commands of the present invention allow transactions to execute without any intervening transactions. In some example, the global lock commands are used to accommodate processor memory accesses that have atomic semantics, such as read-modify-write, test-and-set. In other examples, the global lock commands are used for operations on uncacheable memory and for operations on cacheable memory if the data spans multiple cache lines. The atomicity of such transactions can typically not be handled by the cache itself or by any serialization point. Lock commands also instruct a node to cease operation until after receiving a subsequent unlock command.

It should be noted that the techniques of the present invention refer to several locking mechanisms. One type of locking relates to memory line locking. A memory line is typically locked by a serialization point to preserve cache coherency and to coordinate accesses to particular memory lines by individual nodes. The atomicity of the memory line locking is handled typically by cache itself. For example, a write transaction to a particular memory line by a node will be an atomic transaction.

When a particular memory line is locked, typically no other nodes in a multiple cluster architecture can access the locked memory line. However, other memory lines can be accessed, for example, by other nodes in the system. In one instance, a first processor can write to a first memory line while a second processor is writing to a second memory line.

However, some processor architectures include operations calling for global locking. Some operations that may entail global locking include read-modify-write operations, test-and-set operations, operations on uncacheable memory, and operations on cacheable memory where the data spans multiple cache lines. In global locking transactions, a global lock is broadcasted to the multiple nodes in a multiple cluster architecture. After receiving the lock broadcast transaction, each node no longer issues new transactions. Commands broadcast to a plurality of nodes in multiple clusters for locking nodes are referred to herein as global lock commands. In a multiple-cluster system sharing a single memory space, a lock command typically must be received by all nodes in the system before the command is effective. Moreover, the final "system locked" response sent back to the node requesting a lock should be blocked until after the lock command is received by all nodes in the system and all nodes have transmitted a "locked" response.

According to some embodiments, a node will complete an operation currently under way after receiving a lock command, but will not begin another operation. According to still other embodiments, a node will complete an operation currently under way after receiving a lock command, but only if the operation can be completed within a certain period of time. When all locked responses are received from the various nodes, the system is now locked. Typically when a system is locked, no other transactions on any other memory line can occur. The entire system is placed in a locked state to allow transactions such as read-modify-write and test-and-set to complete. "Unlock" commands instruct a node to resume normal operation.

Data or cache access requests usually target a home node memory controller. Probes are used to query each cache in the system. The probe packet can carry information that allows the caches to properly transition the cache state for a specified line. Responses are used to carry response information and to allow nodes to inform other nodes of the state of a given transaction. For example, after a node has complied with a lock command the node will issue a "locked" response. Similarly, after a node has complied with an unlock command the node will issue an "unlocked" response. Data packets carry request data for both write requests and read responses.

Figure 5A:
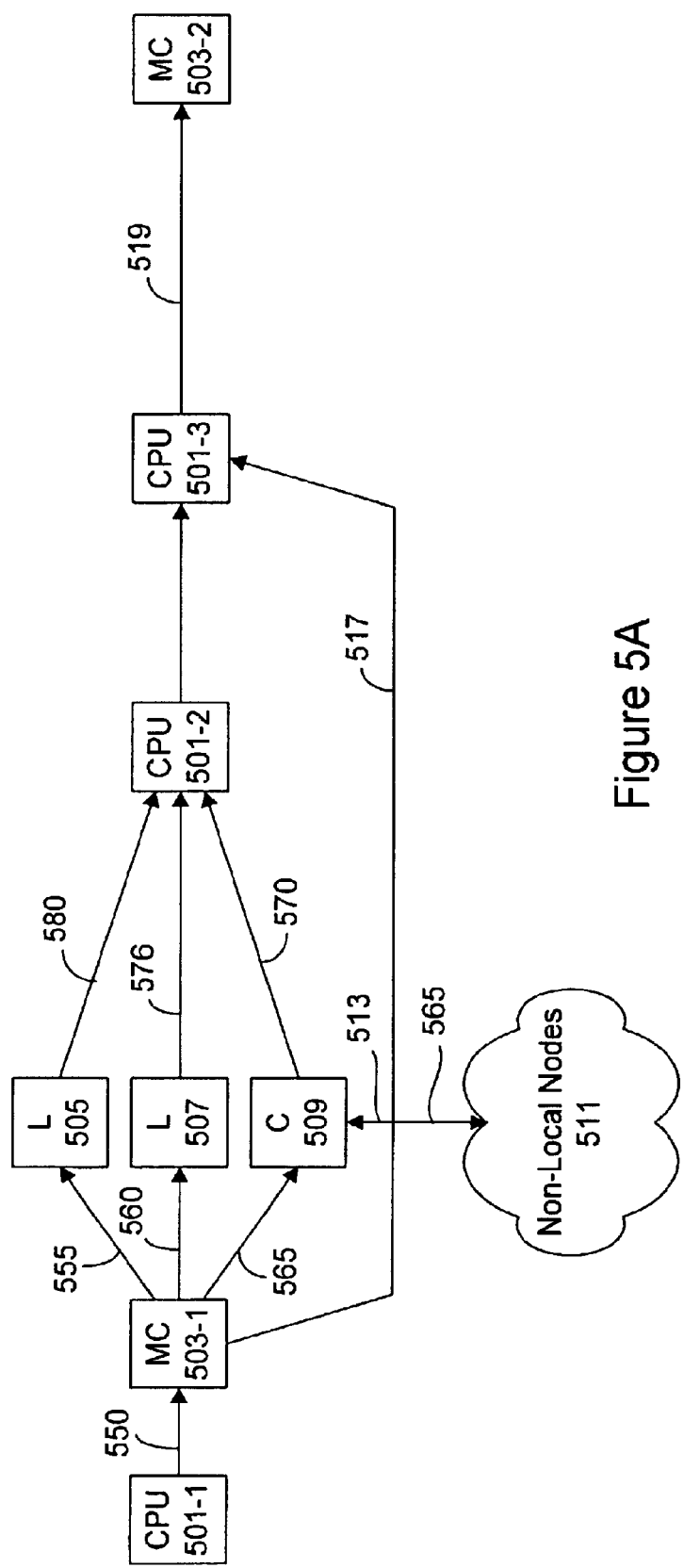

FIG. 5A shows a cache coherence controller acting as an aggregate remote cache. When processor 501-1 generates data access request 550 to local memory controller 503-1, cache coherence controller 509 accepts probe 565 from local memory controller 503-1 and forwards probe 565 to non-local node portion 511. Cache coherence controller 509 then accumulates responses 513 from non-local nodes 511 and sends a single response 570 to processor 501-2 in the same manner that local nodes associated with cache blocks 505 and 507 send single responses 576 and 580. Memory controller 503-1 sends access response 517 (such as a read response) to processor 501-3. Preferably, processor 501-3 then sends "done" response 519 to local memory controller 503-2. Local processors may expect a single probe response for every local node probed. The use of a cache coherence controller allows the local processors to operate without concern as to whether non-local nodes exist.

FIG. 5B shows the cache coherence controller acting as a probing agent pair. When cache coherence controller 521-1 receives probe 581 from non-local nodes 531, cache coherence controller 521-1 accepts probe 581 and forwards probe 581 to local nodes associated with cache blocks 523, 525, and 527. Cache coherence controller 521-2 then forwards final response 582 to non-local node portion 531. In this example, the cache coherence controller is both the source and the destination of the probes. The local nodes associated with cache blocks 523, 525, and 527 behave as if the cache coherence controller were a local processor with a local memory request.

Figure 5C:
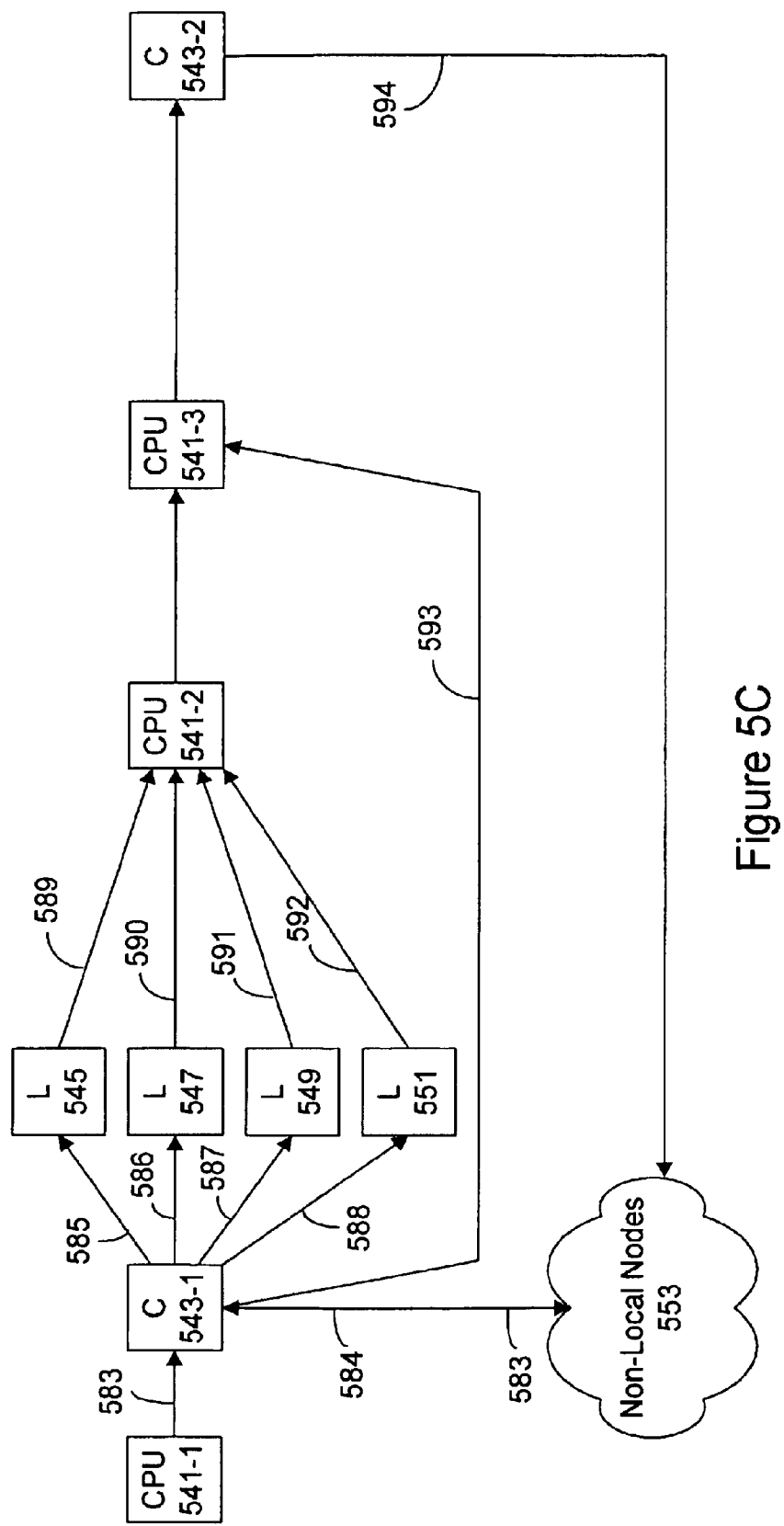

FIG. 5C shows a cache coherence controller acting as a remote memory. When local processor 541-1 generates access request 583 that targets remote memory, cache coherence controller 543-1 forwards request 583 to non-local nodes 553. When remote request 584 specifies local probing, cache coherence controller 543-1 generates probes 585, 586, 587 and 588 to local nodes 545, 547, 549 and 551, respectively. The probed nodes provide responses 589, 590, 591 and 592 to processor 541-2. Once cache coherence controller 543-1 has received data from non-local node portion 553, it forwards read response 593 to the processor 541-3. Cache coherence controller 543-2 forwards final response 594 to the remote memory controller associated with non-local nodes 553.

Figure 5D:
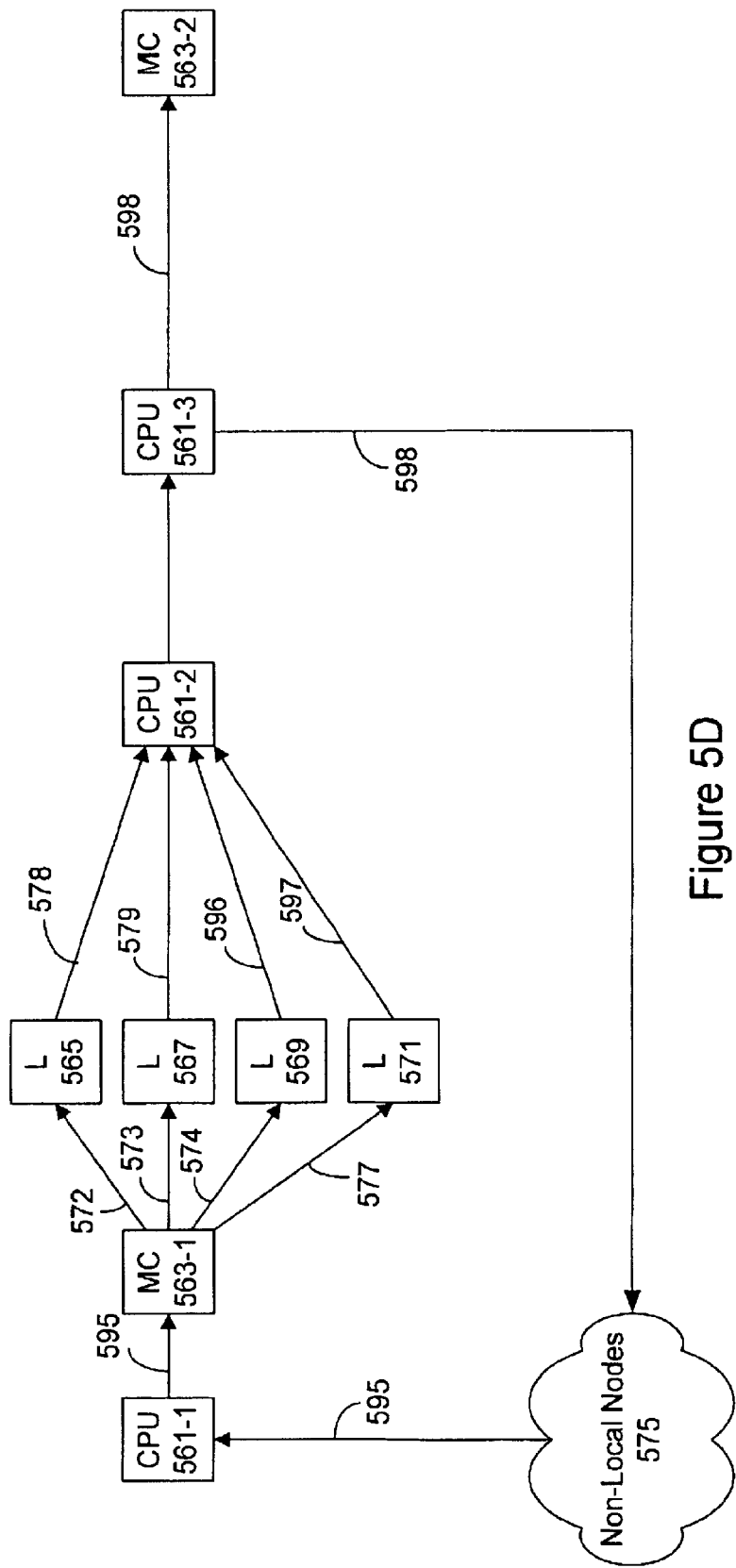

FIG. 5D shows a cache coherence controller acting as a remote processor. When cache coherence controller 561-1 at a first cluster receives request 595 from a processor in a second cluster, cache coherence controller 561-1 acts as a first cluster processor on behalf of the second cluster processor. Cache coherence controller 561-1 accepts request 595 from portion 575 and forwards it to memory controller 563-1, which sends probes 572, 573, 574 and 577 to nodes 565, 567, 569 and 571. Cache coherence controller 561-2 accumulates probe responses 578, 579, 596 and 597, as well as the data fetched. Cache coherence controller 561-3 forwards final response 598 to the memory controller 563-2 as well as to non-local nodes 575.

By allowing the cache coherence controller to act as an aggregate remote cache, probing agent pair, remote memory, and remote processor, multiple-cluster systems can be built using processors that may not necessarily support multiple clusters. The cache coherence controller can be used to represent non-local nodes in local transactions so that local nodes do not need to be aware of the existence of nodes outside of the local cluster.

Figure 6:
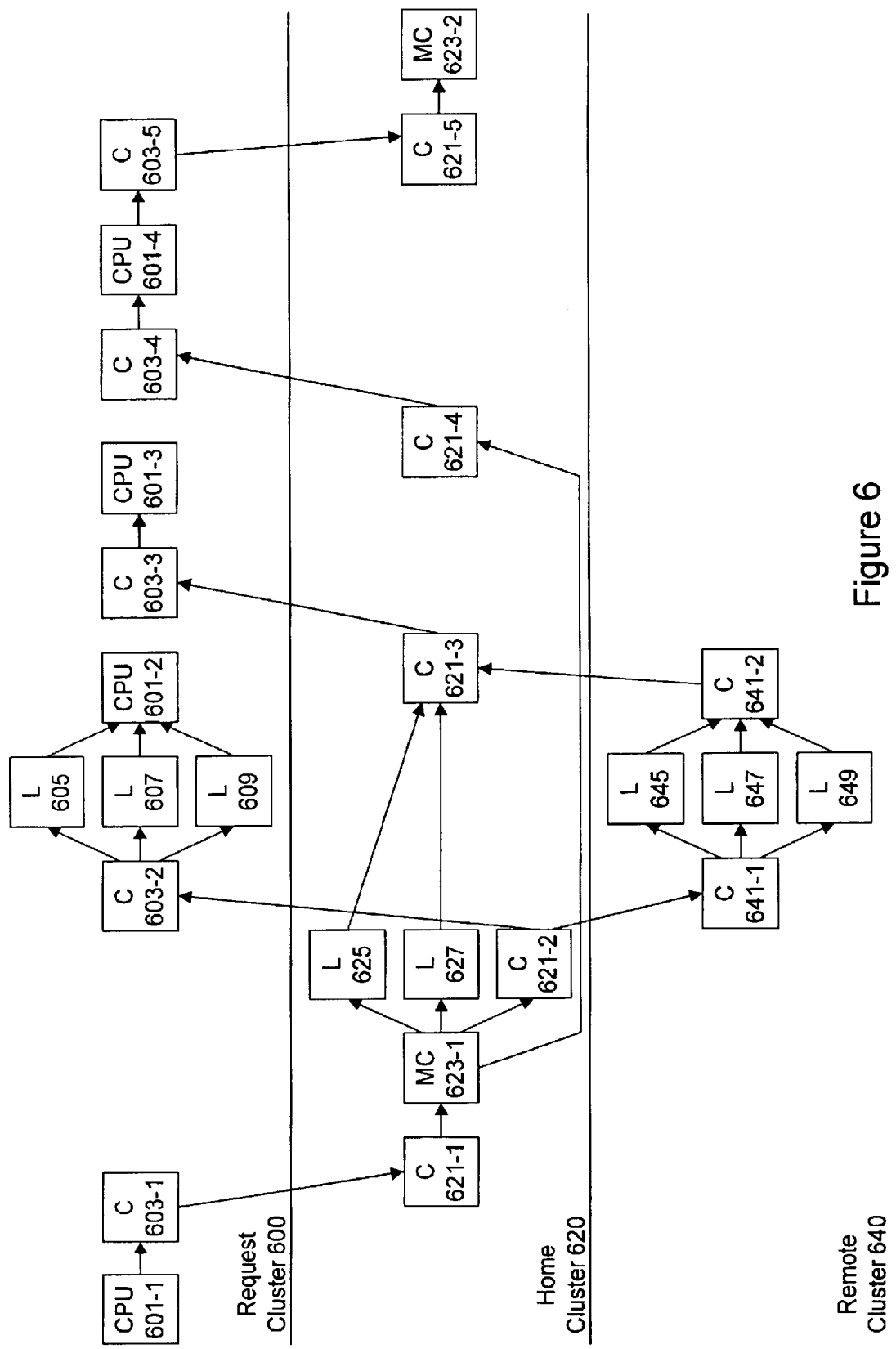
FIG. 6 is a diagrammatic representation depicting a transaction flow for a remote cluster sending a probe response to a home cluster.

FIG. 6 is a diagrammatic representation depicting the transactions for a data request from a local processor sent to a non-local cluster using a cache coherence controller. The multicluster system includes request cluster 600, home cluster 620 and remote cluster 640. As noted above, home cluster 620 and remote cluster 640, as well as any other clusters excluding the request cluster 600, are referred to herein as non-local clusters. Processors and cache coherence controllers associated with local and non-local clusters are similarly referred to herein as local processors, local cache coherence controllers, non-local processors, and non-local cache coherence controllers, respectively.

According to various embodiments, processor 601-1 in local cluster 600 sends a data access request (such as a read request) to cache coherence controller 603-1. Cache coherence controller 603-1 tracks the transaction in a pending buffer (such as the buffer illustrated in FIG. 3) and forwards the request to cache coherence controller 621-1 in home cluster 620. Cache coherence controller 621-1 of home cluster 620 receives the access request and tracks the request in its pending buffer. In one example, information associated with the requests are stored in the pending buffer. Cache coherence controller 621-1 forwards the access request to memory controller 623-1, which is also associated with home cluster 620. At this point, memory controller 623-1 locks the memory line associated with the request. In one example, the memory line is an unique address in the memory space shared by the multiple processors in request cluster 600, home cluster 620, and remote cluster 640. Memory controller 623-1 generates a probe associated with the data access request and forwards the probe to local nodes associated with cache blocks 625 and 627 as well as to cache coherence controller 621-2.

It should be noted that although messages associated with requests, probes, responses, and data are described as forwarded from one node to another, the messages themselves may contain variations. In one example, alterations are made to the messages to allow the multiple-cluster architecture to be transparent to various local nodes. It should be noted that write requests can be handled as well. In write requests, the targeted memory controller gathers responses and sends the responses to the processor when gathering is complete.

Cache coherence controller 641-1 associated with remote cluster 640 receives a probe from cache coherence controller 621-2 and probes local nodes associated with cache blocks 645, 647, and 649. Similarly, cache coherence controller 603-2 associated with the request cluster 600 receives a probe and forwards the probe to local nodes associated with cache blocks 605, 607, and 609 to probe the cache blocks in the request cluster 600. Processor 601-2 receives probe responses from the local nodes associated with cache blocks 605, 607, and 609.

According to various embodiments, cache coherence controller 621-3 accumulates probe responses and sends the probe responses to cache coherence controller 603-3, which in turn forwards the probe responses to processor 601-3. Cache coherence controller 621-4 also sends a read response to cache coherence controller 603-4, which forwards the read response to processor 601-4. While probes and probe responses carry information for maintaining cache coherency in the system, read responses can carry actual fetched data. After receiving the fetched data, processor 601-4 may send a source done response to cache coherence controller 603-5. According to various embodiments, the transaction is now complete at the requesting cluster 600. Cache coherence controller 603-5 forwards the source done message to cache coherence controller 621-5. Cache coherence controller 621-5 in turn sends a source done message to memory controller 623-2. Upon receiving the source done message, the memory controller 623-2 can unlock the memory line and the transaction at home cluster 620 is now complete. Another processor can now access the unlocked memory line.

It should be noted that because cache coherence controller 621-3 waits for remote cluster probe responses before sending a probe response to cache coherence controller 603-3, delay is introduced into the system. According to various embodiments, probe responses are gathered at cache coherence controller 603-3. By having remote clusters send probe responses through a home cluster, both home cluster probe responses and remote cluster probe responses can be delayed at the home cluster cache coherence controller. In one example, remote cluster probe responses have to travel an additional hop in order to reach a request cluster. The latency for transmission of a probe response between a remote cluster and a request cluster may be substantially less than the latency for transmission of a probe response between a remote cluster and a request cluster through a home cluster. Home cluster probe responses are also delayed as a result of this added hop.

As will be appreciated by one of skill in the art, the specific transaction sequences involving requests, probes, and response messages can vary depending on the specific implementation. In one example, cache coherence controller 621-3 may wait to receive a read response message from memory controller 623-1 before transmitting both a probe response message and a read response message to cache coherence controller 603-3. In other examples, a cache coherence controller may be the actual processor generating the request. Some processors may operate as both a processor and as a cache coherence controller. Furthermore, various data access request messages, probes, and responses associated with reads and writes are contemplated. As noted above, any message for snooping a cache can be referred to as a probe. Similarly, any message for indicating to the memory controller that a memory line should be unlocked can be referred to as a source done message.

It should be noted that the transactions shown in FIG. 6 show examples of cache coherence controllers performing many different functions, including functions of remote processors, aggregate local caches, probing agent pairs and remote memory as described with reference to FIGS. 5A–5D.

Cache coherence controller 621-1 of home cluster 620 is acting as a remote processor. When the cache coherence controller receives a request from a request cluster processor, the cache coherence controller is directed to act as the requesting processor on behalf of the request cluster processor. In this case, cache coherence controller 621-1 accepts a forwarded request from processor 601-1 and sends it to memory controller 623-1, accumulates responses from all local nodes and memory controller 623-1, and forwards the accumulated responses and data back to cache coherence controller 603-4. Cache coherence controller 621-5 also forwards a source done response to local memory controller 623-2.

Cache coherence controller 603-1 of request cluster 600 is acting as a remote memory. As remote memory, the cache coherence controller is designed to forward a request from a processor to a proper remote cluster and ensure that local nodes are probed. In this case, cache coherence controller 603-1 forwards a probe to cache coherence controller 621-1 of home cluster 620. Cache coherence controller 603-2 also probes local nodes 605, 607, and 609.

Cache coherence controller 641-1 of request cluster 640 is acting as a probing agent pair. As noted above, when a cache coherence controller acting as a probing agent pair receives a probe from a remote cluster, the cache coherence controller accepts the probe and forwards it to all local nodes. The cache coherence controller accumulates the responses and sends a final response back to the request cluster. Here, cache coherence controller 641-1 sends a probe to local nodes associated with cache blocks 645, 647, and 649, gathers probe responses and sends the probe responses to 20 cache coherence controller 621-3 of home cluster 620. Similarly, cache coherence controller 603-2 also acts as a probing agent pair at request cluster 600. Cache coherence controller 603-2 forwards probe requests to local nodes including local nodes associated with cache blocks 605, 607, and 609.

Cache coherence controller 621-2 and 621-3 is also acting as an aggregate remote cache. Cache coherence controller 621-2 is responsible for accepting the probe from memory controller 623-1 and forwarding the probe to the other processor clusters 600 and 640. More specifically, cache coherence controller 621-2 forwards the probe to cache coherence controller 603-2 corresponding to request cluster 600 and to cache coherence controller 641-1 corresponding to remote cluster 640. As noted above, using a multiple-cluster architecture may introduce delay as well as other undesirable elements such as increased traffic and processing overhead.

Figure 7:
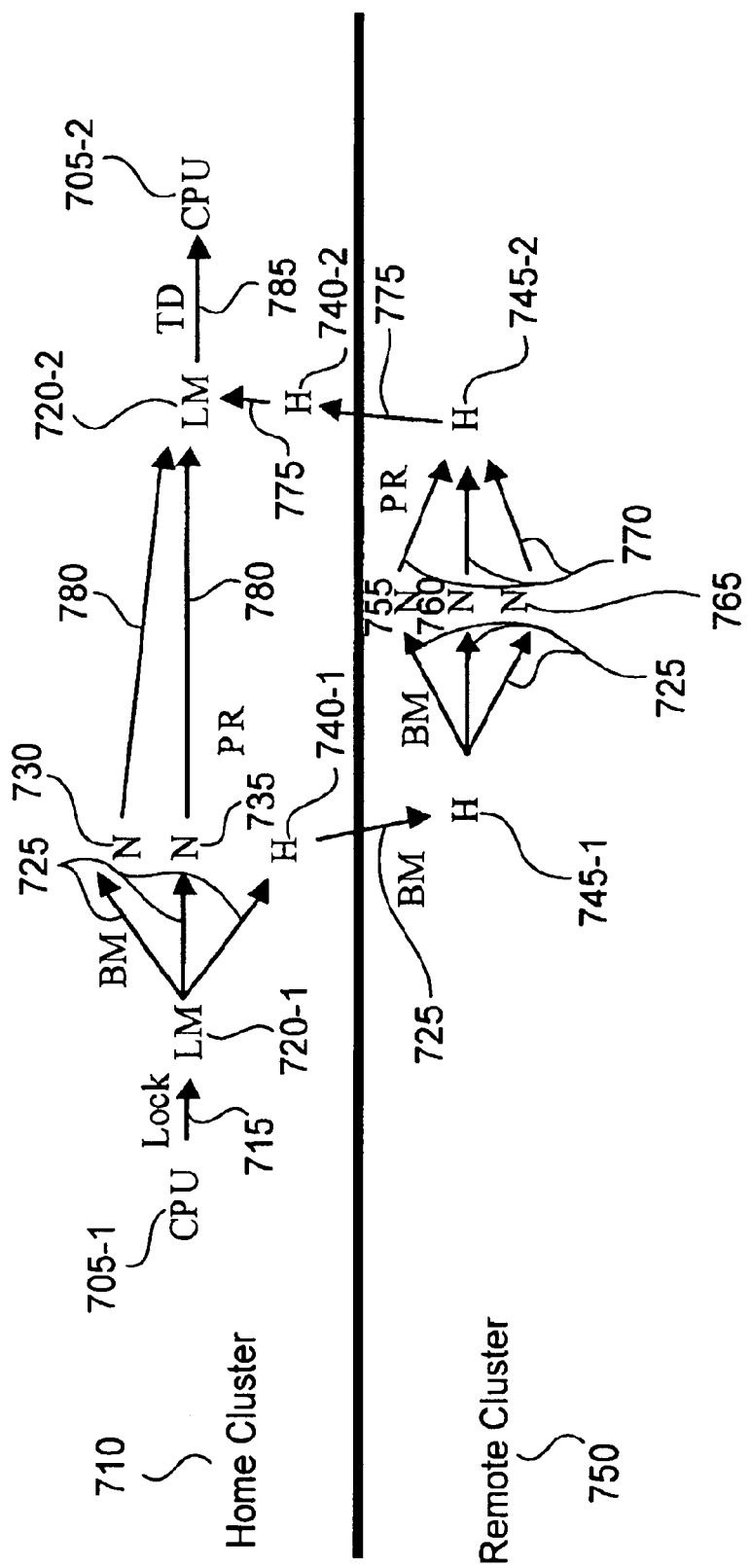
FIG. 7 is a diagrammatic representation depicting a transaction flow for locking a multi-cluster system based on a lock request from a processor in a home cluster.

In FIGS. 7 through 10, each cluster is depicted as having only four nodes. However, the clusters described with reference to FIGS. 7 through 10 may have any convenient number of nodes. FIG. 7 is a diagrammatic representation depicting a transaction flow for locking a multi-cluster system based on a lock request from a requesting home node of a home cluster. The techniques of the present invention allow the efficient distribution of lock commands to multiple nodes in multiple clusters, in which each processor node has no knowledge of remote nodes. In this instance, the requesting home node is home processor 705-1 of home cluster 710, which sends lock request 715 to home lock manager 720-1. As noted above, home lock manager 720-1 may be part of a memory controller or another processor, or home lock manager 720-1 may be a separate controller.

Home lock manager 720-1 broadcasts lock command 725 to all home nodes, including nodes 730 and 735 and home cache coherence controller 740-1. Nodes 730 and 735 may be, for example, other home processors in home cluster 710. Home cache coherence controller 740-1 transmits lock command 725 to remote cache coherence controller 745-1 of remote cluster 750. Remote cache coherence controller 745-1 forwards lock command 725 to remote nodes 755, 760 and 765. In this example, remote nodes 755, 760 and 765 are remote processors which complete operations which had begun prior to receiving the lock command, but do not begin any other operations and do not access additional data from local memory or from a memory shared by all clusters.

After complying with the lock command, each of remote processors 755, 760 and 765 sends "locked" response 770 back to remote cache coherence controller 745-2, indicating that each of remote processors 755, 760 and 765 has complied with lock command 725. After receiving locked response 770 from each of remote processors 755, 760 and 765, remote cache coherence controller 745-2 transmits "remote cluster locked" response 775 to home cache coherence controller 740-2, indicating that each node in remote cluster 750 has complied with lock command 725. Home cache coherence controller 740-2 forwards remote cluster locked response 775 to home lock manager 720-2.

Similarly, home nodes 730 and 735 comply with lock command 725 and issue home locked response 780 to home lock manager 720-2. Home lock manager 720-2 sends system locked response 785 to requesting home node 705-2 only after receiving a locked response from each node in the home cluster. In this example, home lock manager 720-2 sends system locked response 785 to requesting home node 705-2 only after receiving home locked responses 780 from each of home nodes 730 and 735 and after receiving remote cluster locked response 775 from home cache coherence controller 745-2. In this example, home lock manager 720-2 is unaware of the existence of remote cluster 750 and views 745-2 as yet another local node.

Figure 8:
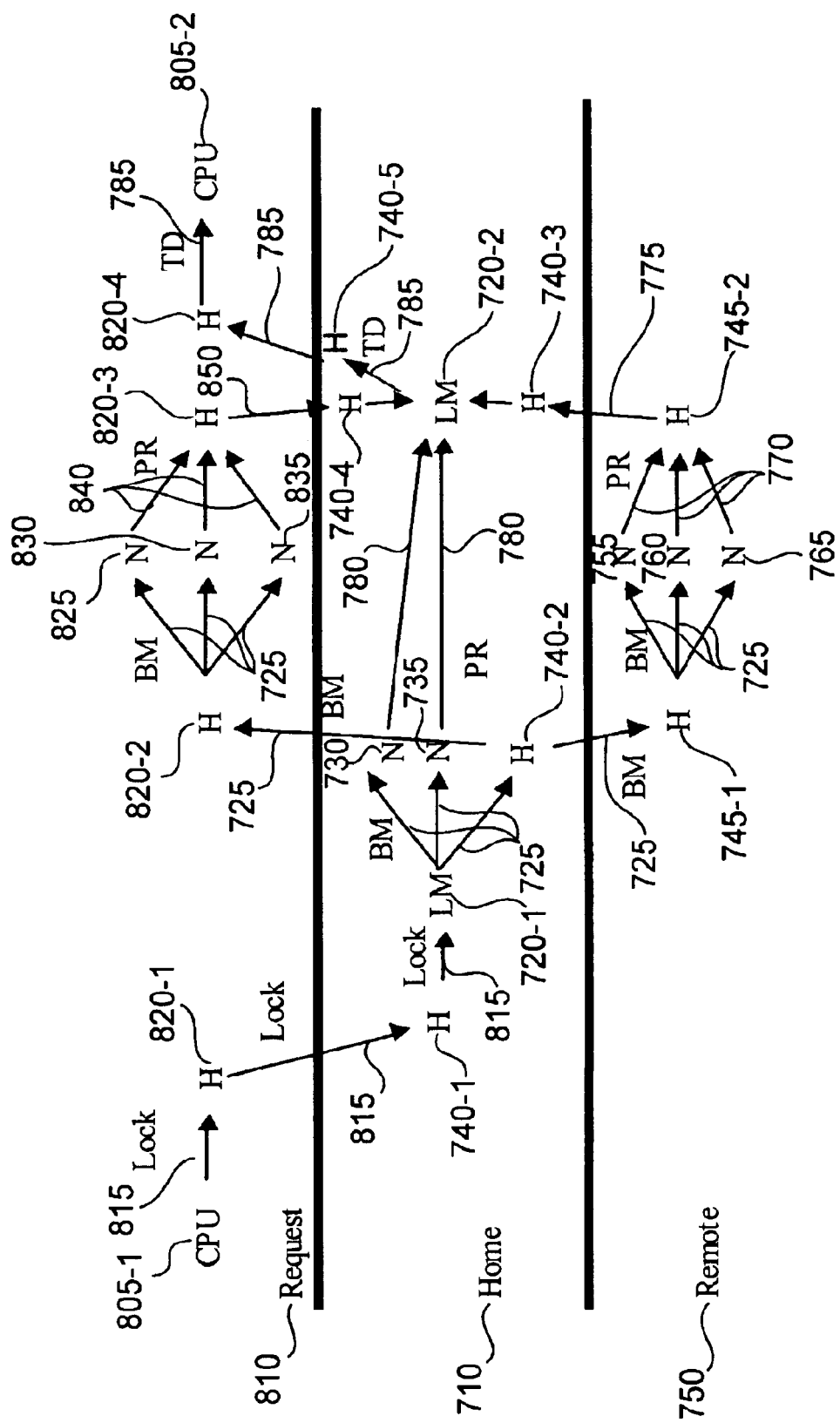
FIG. 8 is a diagrammatic representation showing a transaction flow for locking a multi-cluster system based on a lock request from a processor in a remote cluster.

FIG. 8 is a diagrammatic representation of a transaction flow for locking a multi-cluster system based on a lock request from a requesting processor in a remote cluster, also referred to herein as a requesting cluster. Remote cluster 750 and requesting cluster 810 are both remote clusters and may be regarded as a first and second remote cluster.

In this example, processor 805-1 of requesting cluster 810 issues lock request 815 to requesting cluster cache coherence controller 820-1, which transmits lock request 815 to home cache coherence controller 740-1 of home cluster 710. Home cache coherence controller 740-1 forwards lock request 815 to home lock manager 720-1, which may or may not be aware of the existence of requesting cluster 810 or remote cluster 750. In this example, home lock manager 720-1 is not aware of the existence of requesting cluster 810 or remote cluster 750. Home lock manager 720-1 simply receives lock request 815 from home cache coherence controller 740-1 and treats home cache coherence controller 740-1 as a requesting node.

Therefore, home lock manager 720-1 broadcasts lock command 725 to home cache coherence controller 740-1 and to home nodes 730 and 735. Home cache coherence controller 740-1 transmits lock command 725 to requesting cluster cache coherence controller 820-2 and to remote cache coherence controller 745-1.

Remote cache coherence controller 745-1 forwards lock command 725 to remote nodes 755, 760 and 765. After complying with the lock command, each of remote processors 755, 760 and 765 sends locked response 770 back to remote cache coherence controller 745-2, indicating that each of remote processors 755, 760 and 765 has complied with lock command 725. After receiving locked response 770 from each of remote processors 755, 760 and 765, remote cache coherence controller 745-2 transmits remote cluster locked response 775 to home cache coherence controller 740-3, indicating that each node in remote cluster 750 has complied with lock command 725. Home cache coherence controller 740 forwards remote cluster locked response 775 to home lock manager 720-2.

Similarly, requesting cluster cache coherence controller 820-2 forwards lock command 725 to requesting cluster nodes 825, 830 and 835, which indicate compliance with lock command 725 by issuing locked responses 840 to requesting cluster cache coherence controller 820-3. After receiving locked responses 840 from each of requesting cluster nodes 825, 830 and 835, requesting cluster cache coherence controller 820-3 transmits requesting cluster locked response 850 to home cache coherence controller 740-4. In this example, home cache coherence controller 740-4 sends a locked response to home lock manager 720-2 only after receiving remote cluster locked response 775 and requesting cluster locked response 850.

Home nodes 730 and 735 comply with lock command 725 and issue home locked responses 780 to home lock manager 720-2. Home lock manager 720-2 sends system locked response 785 to requesting home node 740-5 only after receiving a locked response from each node in the home cluster. Here, home lock manager 720-2 sends system locked response 785 to home cache coherence controller 740-5 only after receiving home locked response 780 from each of home nodes 730 and 735 and also receiving a locked response from home cache coherence controller 740-4.

Figure 9:
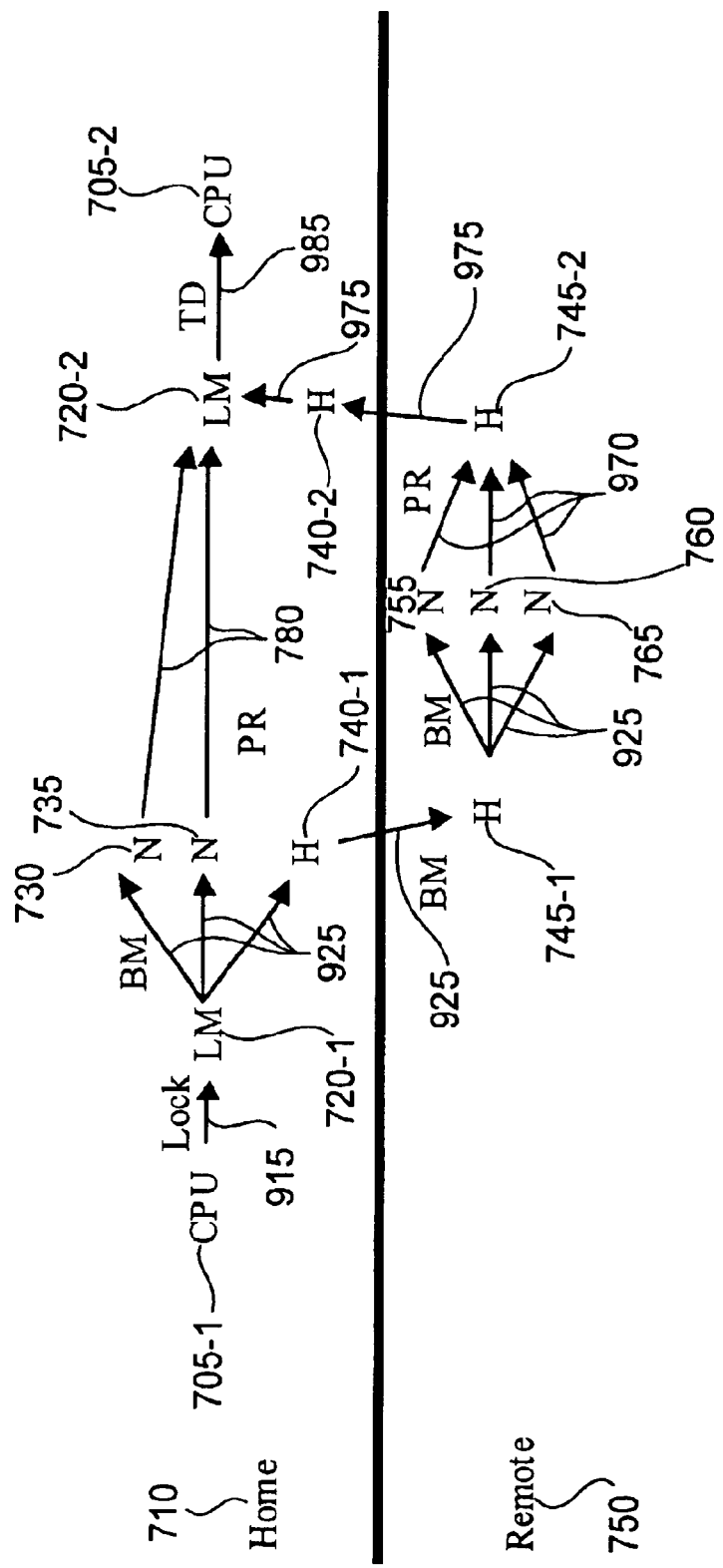
FIG. 9 is a diagrammatic representation depicting a transaction flow for unlocking a multi-cluster system based on an unlock request from a processor in a home cluster.

FIG. 9 is a diagrammatic representation depicting a transaction flow for unlocking a multi-cluster system based on an unlock request from a processor in a home cluster. In this example, home processor 705-1 of home cluster 710 sends unlock request 915 to home lock manager 720-1. Home lock manager 720-1 broadcasts unlock command 925 to all home nodes, including nodes 730 and 735 and home cache coherence controller 740-1. Home cache coherence controller 740-1 transmits unlock command 925 to remote cache coherence controller 745-1 of remote cluster 750.

Remote cache coherence controller 745-1 forwards unlock command 925 to remote nodes 755, 760 and 765. After complying with the unlock command, each of remote processors 755, 760 and 765 sends unlocked response 970 back to remote cache coherence controller 745-2, indicating that each of remote processors 755, 760 and 765 has complied with unlock command 925. After receiving unlocked response 970 from each of remote processors 755, 760 and 765, remote cache coherence controller 745-2 transmits remote cluster unlocked response 975 to home cache coherence controller 740-2, indicating that each node in remote cluster 750 has complied with unlock command 925. Home cache coherence controller 740-2 forwards remote cluster unlocked response 975 to home lock manager 720-2.

Similarly, home nodes 730 and 735 comply with unlock command 925 and issue home unlocked response 980 to home lock manager 720-2. Home lock manager 720-2 sends system unlocked response 985 to requesting home node 705-2 only after receiving an unlocked response from each node in the home cluster. In this example, home lock manager 720-2 sends system unlocked response 985 to requesting home node 705-2 only after receiving home unlocked responses 980 from each of home nodes 730 and 735 and after receiving remote cluster unlocked response 975 from home cache coherence controller 745-2.

Figure 10:
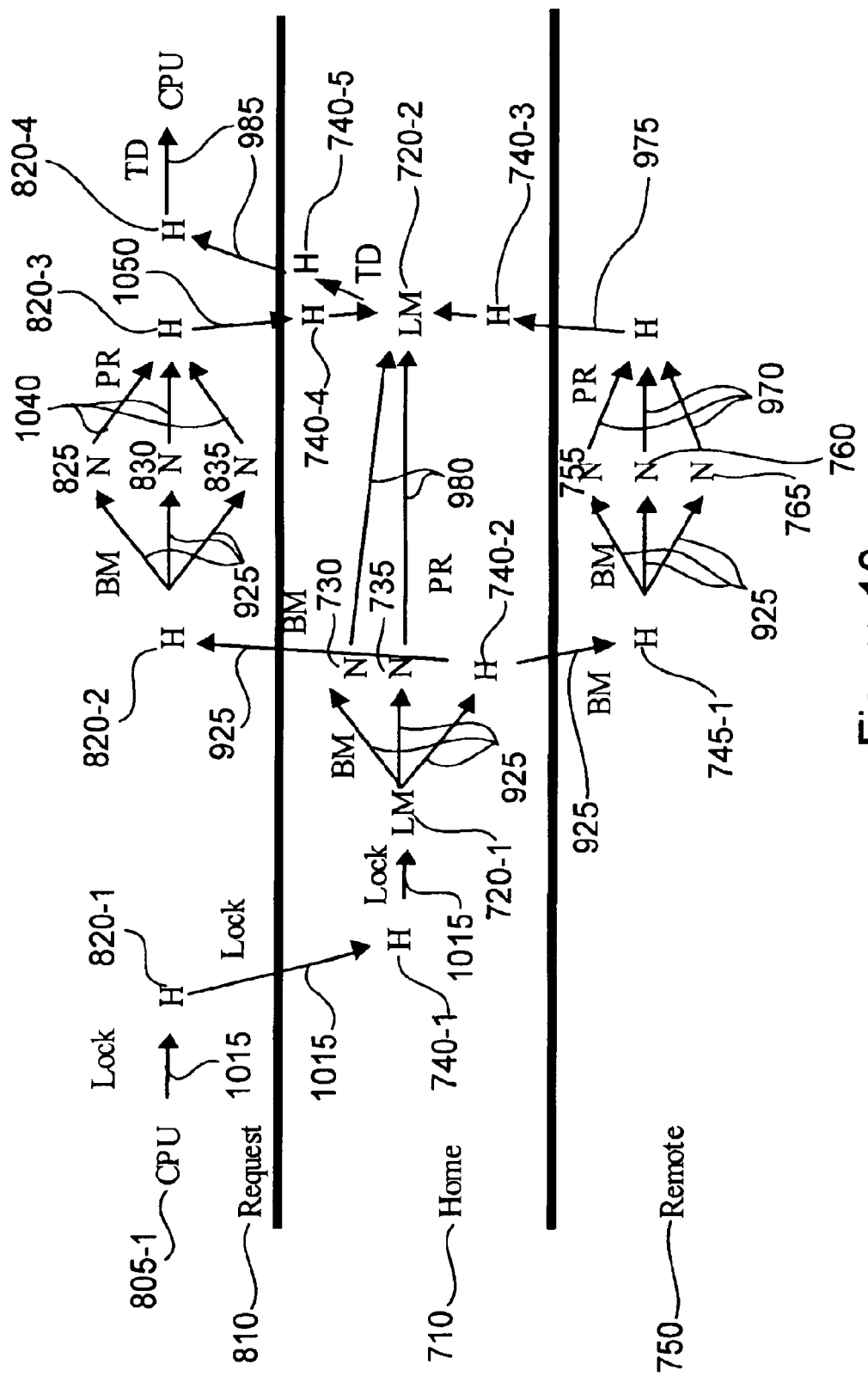
FIG. 10 is a diagrammatic representation showing a transaction flow for unlocking a multi-cluster system based on an unlock request from a processor in a remote cluster.

FIG. 10 is a diagrammatic representation showing a transaction flow for unlocking a multi-cluster system based on an unlock request from a processor in a remote cluster. As noted above, remote cluster 750 and requesting cluster 810 are both remote clusters and may be regarded as a first and second remote cluster.

In this example, processor 805-1 of requesting cluster 810 issues unlock request 1015 to requesting cluster cache coherence controller 820-1, which transmits unlock request 1015 to home cache coherence controller 740-1 of home cluster 710. Home cache coherence controller 740-1 forwards unlock request 1015 to home lock manager 720-1, which may or may not be aware of the existence of requesting cluster 810 or remote cluster 750. In this example, home lock manager 720-1 is not aware of the existence of requesting cluster 810 or remote cluster 750. Home lock manager 720-1 receives unlock request 1015 from home cache coherence controller 740-1 and treats home cache coherence controller 740-1 as a requesting node.

Accordingly, home lock manager 720-1 broadcasts unlock command 925 to home cache coherence controller 740-2 and to home nodes 730 and 735. Home cache coherence controller 740-2 transmits unlock command 925 to requesting cluster cache coherence controller 820-2 and to remote cache coherence controller 745-1.

Remote cache coherence controller 745-1 forwards unlock command 925 to remote nodes 755, 760 and 765, which obey unlock command 925 as described above. After complying with the unlock command, each of remote processors 755, 760 and 765 sends unlocked response 970 back to remote cache coherence controller 745-2, indicating that each of remote processors 755, 760 and 765 has complied with unlock command 925. After receiving unlocked response 970 from each of remote processors 755, 760 and 765, remote cache coherence controller 745-2 transmits remote cluster unlocked response 975 to home cache coherence controller 740-3, indicating that each node in remote cluster 750 has complied with unlock command 925.

Similarly, requesting cluster cache coherence controller 820-2 forwards unlock command 925 to requesting cluster nodes 825, 830 and 835, which indicate compliance with unlock command 925 by issuing unlocked responses 1040 to requesting cluster cache coherence controller 820-3. After receiving unlocked responses 1040 from each of requesting cluster nodes 825, 830 and 835, requesting cluster cache coherence controller 820-3 transmits requesting cluster unlocked response 1050 to home cache coherence controller 740-4. Home cache coherence controller 740-4 sends an unlocked response to home lock manager 720-2 after receiving remote cluster unlocked response 975 and requesting cluster unlocked response 1050.

Home nodes 730 and 735 comply with unlock command 925 and issue home unlocked responses 980 to home lock manager 720-2. Home lock manager 720-2 sends system unlocked response 985 to requesting home node 705-2 only after receiving an unlocked response from each node in the home cluster. Here, home lock manager 720-2 sends system unlocked response 985 to home cache coherence controller 740-5 only after receiving home unlocked response 980 from each of home nodes 730 and 735 and also receiving an unlocked response from home cache coherence controller 740-4.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may share a single cache coherence controller, or multiple cache coherence controllers can be used in a single cluster. FIGS. 7 through 12 of U.S. patent application Ser. No. 10/145,439 (filed May 13, 2002) and the accompanying discussion on page 21, line 11 through page 28, line 2, which provide further details regarding the operation of cache coherence controllers in multi-cluster systems, are hereby incorporated by reference for all purposes. Therefore, the scope of the invention should be determined with reference to the appended claims.

I claim:

1. A computer system, comprising:
 a home cluster comprising a plurality of home nodes, including a plurality of home processors and a home cache coherence controller, wherein the home nodes are interconnected in a first point-to-point architecture, wherein one of the plurality of home nodes comprises a home lock manager configured to broadcast a lock command to the plurality of home processors and the home cache coherence controller; and
 a first remote cluster comprising a first remote cache coherence controller and a first plurality of remote processors, wherein the first remote cache coherence controller and the first plurality of remote processors are interconnected in a second point-to-point architecture and wherein the first remote cache coherence controller is configured to receive the lock command via the home cache coherence controller and to forward the lock command to the first plurality of remote processors;

wherein the home cache coherence controller has access to a home configuration register that includes a home lock manager location and a first remote cache coherence controller location.

2. The computer system of claim 1, wherein each of the plurality of home nodes has access to a configuration register that indicates a lock manager location.

3. The computer system of claim 1, wherein each of the first plurality of remote processors has access to a configuration register that indicates a location of the first remote cache coherence controller as a first remote lock manager location.

4. The computer system of claim 1, wherein the home cache coherence controller has access to a home Horus configuration register that includes a home lock manager location and a first remote cache coherence controller location.

5. The computer system of claim 1, wherein the first remote cache coherence controller has access to a first remote configuration register that includes a home lock manager locations.

6. A computer system, comprising:
   a home cluster comprising a plurality of home nodes, including a plurality of home processors and a home cache coherence controller, wherein the home nodes are interconnected in a first point-to-point architecture, wherein one of the plurality of home nodes comprises a home lock manager configured to broadcast a lock command to the plurality of home nodes and wherein each home node includes a home configuration register that specifies a location of the home lock manager as a recipient of home lock requests; and
   a first remote cluster comprising a first remote cache coherence controller and a first plurality of remote processors, wherein the first remote cache coherence controller and the first plurality of remote processors are interconnected in a second point-to-point architecture, wherein the first remote cache coherence controller is interconnected with the home cache coherence controller and wherein each of the first plurality of remote processors includes a first remote configuration register that specifies a location of the first remote cache coherence controller as a recipient of first remote lock requests;
   wherein the home cache coherence controller has access to a home configuration register that includes a home lock manager location and a first remote cache coherence controller location.

7. The computer system of claim 6, wherein the first remote cache coherence controller has access to a first remote configuration register that specifies the home cache coherence controller as a recipient of first remote lock requests.

8. The computer system of claim 6, wherein the home cache coherence controller has access to a home configuration register that specifies the first remote cache coherence controller as a recipient of lock commands received from the home lock manager.

9. A computer system, comprising:
   a home cluster comprising a plurality of home nodes, including a plurality of home processors and a home cache coherence controller, wherein the home nodes are interconnected in a first point-to-point architecture and wherein one of the plurality of home nodes comprises a home lock manager; and
   a first remote cluster comprising a first remote cache coherence controller and a first plurality of remote processors, wherein the first remote cache coherence controller and the first plurality of remote processors are interconnected in a second point-to-point architecture, wherein the first remote cache coherence controller is interconnected with the home cache coherence controller and wherein the first remote cache coherence controller is configured to act as a first remote lock manager for the first remote cluster;
   wherein the home cache coherence controller has access to a home configuration register that includes a home lock manager location and a first remote cache coherence controller location.

10. The computer system of claim 9, wherein the home cache coherence controller has access to a home configuration register that includes a home lock manager location and a first remote cache coherence controller location.

11. The computer system of claim 9, wherein the first remote cache coherence controller has access to a first remote configuration register that includes a home lock manager location.

12. The computer system of claim 9, wherein the home lock manager is configured to receive a home cluster lock request from any home node and to broadcast a lock command to all home nodes in response to the lock request.

13. The computer system of claim 12, wherein the home cache coherence controller is configured to receive the lock command from the home lock manager and to transmit the lock command to the first remote cache coherence controller, and wherein the first remote cache coherence controller is configured to forward the lock command to all of the first plurality of remote processors.

14. The computer system of claim 9, wherein the first remote cache coherence controller is configured to receive a first remote cluster lock request from any of the first plurality of remote processors and to forward the first remote cluster lock request to the home cache coherence controller, wherein the home cache coherence controller is configured to forward the first remote cluster lock request to the home lock manager, and wherein the home lock manager is configured to broadcast a lock command to all home nodes in response to the first remote cluster lock request.

15. The computer system of claim 9, further comprising a second remote cluster comprising a second plurality of remote nodes interconnected in a third point-to-point architecture, the second plurality of remote nodes including a second plurality of remote processors and a second remote cache coherence controller, wherein the second remote cache coherence controller is interconnected with the home cache coherence controller and wherein the second remote cache coherence controller is configured to act as a lock manager for the second remote cluster.

16. A computer system, comprising:
   a home cluster comprising a plurality of home processors and a home cache coherence controller interconnected in a first point-to-point architecture, wherein one of the plurality of home processors comprises a home lock manager;
   a first remote cluster comprising a first plurality of remote processors and a first remote cache coherence controller interconnected in a second point-to-point architecture, wherein the first remote cache coherence controller is interconnected with the home cache coherence controller and wherein the first remote cache coherence controller is configured to act as a first remote cluster lock manager by relaying signals to and from the home lock manager via the home cache coherence controller; and
   a second remote cluster comprising a second plurality of remote processors and a second remote cache coherence controller interconnected in a third point-to-point architecture, wherein the second remote cache coherence controller is interconnected with the home cache coherence controller and wherein the second remote cache coherence controller is configured to act as a second remote cluster lock manager by relaying signals to and from the home lock manager via the home cache coherence controller;

wherein the home cache coherence controller has access to a home configuration register that includes a home lock manager location and a first remote cache coherence controller location.

17. A method of controlling lock commands within a computer system, the method comprising:

receiving a lock request from a requesting home node of a plurality of home nodes in a home cluster, the home nodes comprising a plurality of home processors and a home cache coherence controller interconnected in a first point-to-point architecture;

broadcasting a lock command to all home nodes, the lock command responsive to the lock request; and transmitting the lock command from the home cache coherence controller to a first remote cache coherence controller of a first remote cluster comprising a plurality of first remote processors interconnected in a second point-to-point architecture with the first remote cache coherence controller;

wherein the home cache coherence controller has access to a home configuration register that includes a home lock manager location and a first remote cache coherence controller location.

18. The method of claim 17, wherein the requesting home node is the home cache coherence controller, further comprising the steps of:

sending a lock request from a first remote processor of the plurality of first remote processors to the first remote cache coherence controller; and relaying the lock request from the first remote cache coherence controller to the home cache coherence controller.

19. The method of claim 17, wherein the transmitting step further comprises transmitting the lock command to a second remote cache coherence controller of a second remote cluster comprising a plurality of second remote processors.

20. The method of claim 19, wherein the requesting home node is the home cache coherence controller, further comprising the steps of:

sending a lock request from a second remote processor of the plurality of second remote processors to the second remote cache coherence controller; and relaying the lock request from the second remote cache coherence controller to the home cache coherence controller.

* * * * *